June 10, 1952 A. W. WERTEPNY ET AL 2,600,036
PINKING SHEARS
Filed Oct. 4, 1948 2 SHEETS—SHEET 1
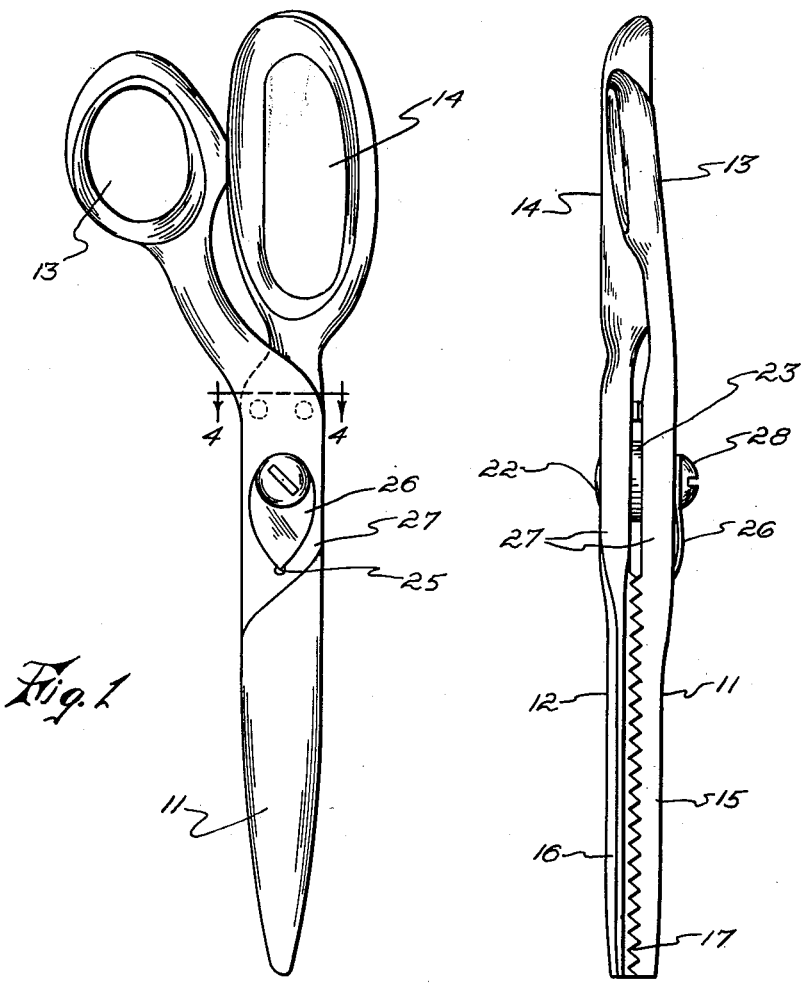
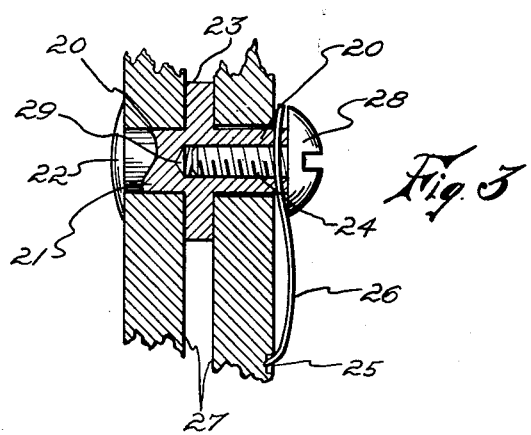
INVENTOR.
Alexander W. Wertepny
BY Rudolph J. Wertepny
John F Brezina June 10, 1952 A. W. WERTEPNY ET AL 2,600,036
PINKING SHEARS
Filed Oct. 4, 1948 2 SHEETS—SHEET 2
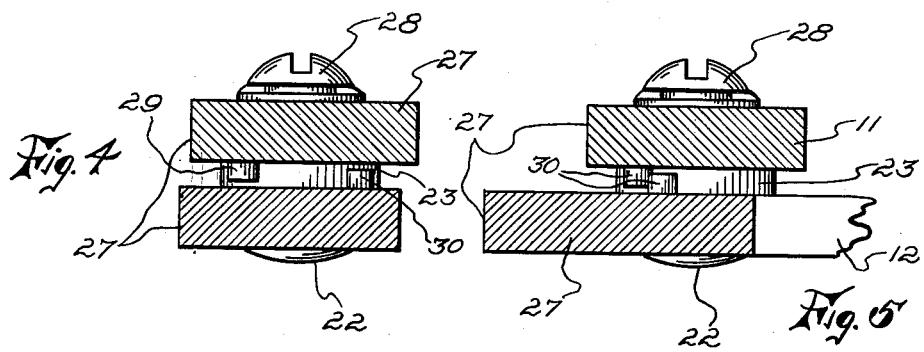
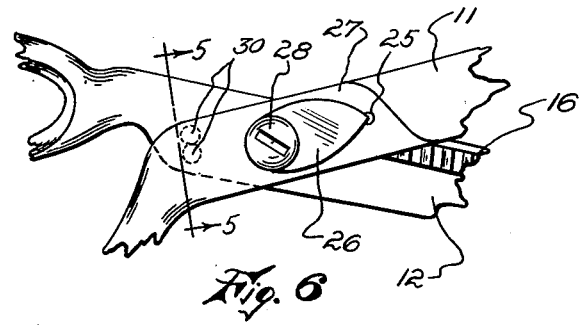
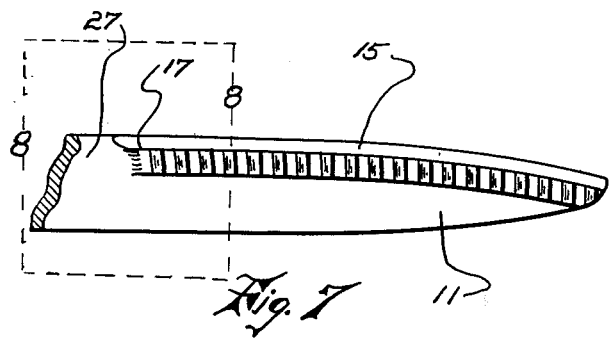
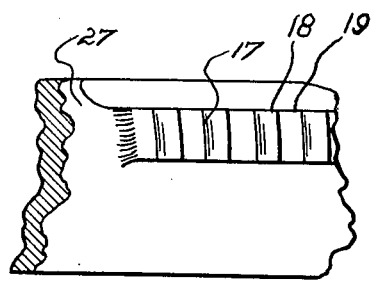
INVENTOR.
Alexander W. Wertepny
BY Rudolph J. Wertepny
John F Brezina
att.

Patented June 10, 1952

2,600,036

UNITED STATES PATENT OFFICE 2,600,036

PINKING SHEARS

Alexander W. Wertepny and Rudolph J. Wertepny, Chicago, Ill., assignors of sixty per cent to Stanley A. Wertepny, Edward M. Wertepny, and Benjamin Luscalzo, Chicago, Ill.

Application October 4, 1948, Serial No. 52,736

2 Claims. (Cl. 30—268)

This invention relates to new and novel improvements in a class of shears commonly known as pinking shears. Prior known kinds of shears used in pinking have not been entirely satisfactory because with slight wear or incautious use the shears became improperly aligned so that operation of the shears, if not exasperating and inefficient, became impossible for numerous reasons. Several underlying causes are subsequently described.

One of the primary factors involved in the rendering inoperative of heretofore known types of pinking shears has been the wearing of teeth or serrations because of use. Because no, or very poor means have been provided in most well known kinds of pinking shears for aligning the blades, and consequently the teeth or serrated cutting edges, those shears would soon become unusable without being realigned. The realignment involved was costly, requiring precision methods.

One of the objects of our new and novel shears is to provide an adjustable tension means connected to one of the blades or jaws of the shears which will keep the teeth in efficient cutting relationship so that the cutting plane is always perpendicular to the pivotal axis.

Another of the factors involved in the inefficiency of prior known types of pinking shears is the disaligning of the jaws due to the fact that material to be cut would accumulate hubward, beyond the cutting teeth. This phenomenon would result in malalignment of the cutting teeth which in turn would cause chipping or abnormal wear of one of the teeth. The abnormal wear on any of the teeth would cause a chain result, causing all of the teeth to eventually be useless in cutting.

Another of the objects of our new and novel device is to provide, on the hub portion of each of the blades or jaws, extensions or teeth which are adapted to limit the opening of the jaws to thereby preclude the gathering of material beyond the cutting teeth.

Another object of our invention is to provide a flange on each of the jaws of a pinking shears; precision machined teeth spaced along the longitudinal axes of the respective flanges; said teeth being formed of merging machined arcuate faces which are concentric with the pivotal axis of the shears; adjustable tension means for keeping the teeth in a cooperable alignment; and means for limiting the opening of the jaws to prevent gathering of material beyond the teeth.

Other and further objects of our invention will become apparent from the following description and appended claims, reference being made to the drawings herein and the numerals of reference thereon.

On the drawings:

Fig. 1 is a side elevation of a pair of pinking shears with the jaws closed, looking at the side which discloses the tension spring means.

Fig. 2 is an elevation taken at right angles to Fig. 1.

Fig. 3 is an enlarged fragmentary section with parts broken away and showing the pivoting mechanism of our pinking shears.

Fig. 4 is an enlarged section taken substantially on the line 4—4 of Fig. 1 and showing the pivoting mechanism and the relation of the members utilized in limiting the opening of the jaws.

Fig. 5 is an enlarged section taken substantially on a line 5—5 of Fig. 6 showing the pivoting means and the members utilized in limiting the opening of the jaws, said limiting means being shown in abutting position and operating to keep the jaws from opening further.

Fig. 6 is a fragmentary view of a side elevation showing the jaws in extreme open position.

Fig. 7 is a fragmentary view of a side elevation of the inner surface of one of the jaws showing the flange which bears the cutting teeth or serrations.

Fig. 8 is an enlarged view of the structures in box 8 of Fig. 7 showing how the teeth are formed.

Referring to the drawings, numerals 11 and 12 designate a pair of cooperating jaws or blades having the usual finger openings 13 and 14. Preferably integral with a portion of the upper and inner edge of jaw 11, and with a portion of the lower and inner edge of jaw 12, are preferably arcuately shaped, preferably integral and inwardly extending flanges 15 and 16 respectively which may extend the length of the jaws from the hub portion 27.

The lower edge of jaw 11 and upper edge of jaw 12 are preferably curved as illustrated in Figs. 1 and 7. Each of the flanges 15 and 16 is provided with a plurality of machined transverse serrations or teeth 17, preferably extending the entire length of said flanges. The teeth 17 are preferably disposed in a curved relation substantially corresponding to the curvature of the respective flanges 15 and 16. Each of the teeth is formed by two sloping and merging arcuate faces 18 and 19. Each of the arcuate faces 18 and 19 slopes in opposite directions from an apex line which forms the top of the tooth 17. In cross section each of the teeth is substantially triangular. Each of the faces 18 and 19 is curved in such a manner that a cutting plane is produced which is perpendicular to the pivotal axis, said faces 18 and 19 being arcuate and machined in planes concentric to the pivotal axis of the shears.

Each of the jaws 11 and 12 at the hub portion 27 thereof is provided with a precision drilled aperture or hole 20. The aperture 20 in each of the jaws is in alignment with the aperture in the other of the jaws. A flanged and recessed pivoting member 21 is preferably rigidly positioned in the aperture of one of the jaws, preferably jaw 12, and is incapable of movement independent of said last jaw. Said member 21 is positioned in the aperture in jaw 11, said jaw being pivotable around said pivot member. Pivot member 21 may be provided with a preferably integral jaw-engaging portion, cap or head 22. Pivot member 21 is provided with a preferably integral annular flange 23 having a bearing surface for the jaw 11. Said bearing member 23 is utilized as a spacer and provides for the normal spacing of the jaws 11 and 12. Pivot member 21 is provided with a threaded recess 29 which is adapted to receive an adjustable headed screw 24, which is adapted to draw the jaws 11 and 12 together to compensate for wear due to use.

Preferably jaw 11 is provided with a recess 25 which may be at the hub portion 27 thereof, and which is adapted to receive one end of the tension means or spring 26, said recess providing surfaces against which said spring 26 may develop its leverage. The spring 26 is preferably ovate in shape and is preferably apertured at one end thereof, and is positioned through said aperture around and about the screw 24 by which said spring is retained. The spring 26 is adapted to apply a tension on the shears to thereby aid in keeping the teeth 17 in a cooperable relationship and thereby provide for a more efficient shears. The adjustable tensing of spring 26 is provided by screw 24, against the head 28 of which spring 26 abuts, said spring being positioned between the shears (jaw 11) and head 28 as illustrated in Figs. 2 and 3.

The recess 29, as illustrated in Fig. 3, provides for a threading of screw 24 thereinto. Not only will a tightening of the screw 24 keep the jaws 11 and 12 from undesirable rocking due to wearing of the parts, including the flange 23, but also it will increase pressure on the spring 26 which in turn will thereby transmit the pressure to the appropriate jaw to keep same in cooperable relationship with the other jaw of the shears.

As illustrated in Figs. 4, 5 and 6, preferably each of the jaws 11 and 12, at an inner portion of the hub 27 thereof, is provided with an inwardly extending extension 30. The extension, lug, or cooperating member 30 may be welded, or equivalently mounted, or may be cast directly with its respective jaw. Cooperating means 30 may be optionally positioned but are adapted to limit the opening of the jaws or blades 11 and 12. The limiting should be preferably at a position not beyond the gripward ends of the rows of teeth or serrations 17. By doing this, the material to be cut will never gather between the blades and cause malalignment of the jaws.

We wish it to be understood that in one form the teeth of each blade or jaw of our shears are machined in a single operation. The holes or apertures 29, pivot member 21, spring 26, being precision made, will permit assembly of cooperating pairs of toothed jaws 11 and 12 in cutting relationship, and will not thereafter require grinding of teeth to return the jaws to cooperating relationship. It should be understood that the teeth 17 of each jaw are precision machined after the pivot hole or aperture 20 has been drilled. This will insure that, after assembly of the jaws 11 and 12, the teeth 17 will be in exact cutting relation and will so meet.

As many changes could be made in the above construction, and as many apparently widely different embodiments of our invention within the scope of the claims could be constructed without departing from the spirit and scope thereof, it is intended that all matter contained in the accompanying specification shall be interpreted as illustrative and not in a limiting sense.

We claim:

1. In a pinking shears, a pair of blades having inwardly extending flanges formed with cooperating teeth, said blades having spaced mutually facing hub portions, one of said hub portions having a cylindrical pivot bore and also having an annular bearing surface about that end of said bore which is proximate to the other hub portion, a pivot member rigidly fixed to said other hub portion against independent movement relative thereto and formed with an annular bearing surface in rotary bearing engagement with the annular bearing surface of said one hub portion, said pivot member having an integral cylindrical internally threaded end portion disposed in said bore, a headed screw threaded in said end portion, and a spring confined between said one hub portion and the head of said screw, said screw being rotatable relative to said pivot member to vary the spring pressure and thereby obtain proper engagement between said bearing surfaces.

2. In a pinking shears, a pair of blades having inwardly extending flanges formed with cooperating teeth, said blades having spaced mutually facing hub portions, said hub portions having coaxial cylindrical bores, a pivot member having axially spaced cylindrical portions disposed in the respective bores and an intermediate integral annular plate-like flange whose faces extend in parallel planes normal to said axis, said pivot member having an integral head at the outer end of one of said cylindrical portions, said head and one face of said flange being in rivet-tight engagement with the respective outer and inner faces of one of said hub portions so that said pivot member is incapable of movement independent of said one hub portion, the other cylindrical portion being internally threaded, a headed screw engaged in said other cylindrical end portion, and a spring under pressure between the screw head and the outer face of the other hub portion and holding the other face of said flange in rotary bearing engagement with the inner face of said other hub portion.

ALEXANDER W. WERTEPNY.
RUDOLPH J. WERTEPNY.

REFERENCES CITED

The following references are of record in the file of this patent:

UNITED STATES PATENTS

| Number | Name | Date |
|---|---|---|
| 363,049 | Deichmann | May 17, 1887 |
| 398,509 | Henckels | Feb. 26, 1889 |
| 841,690 | Holtgrave | Jan. 22, 1907 |
| 923,621 | Bowes | June 1, 1909 |
| 947,626 | Chapin | Jan. 25, 1910 |
| 1,205,999 | Kermsee | Nov. 28, 1916 |
| 1,723,756 | Zeidler | Aug. 6, 1929 |
| 1,822,591 | Hickok | Sept. 8, 1931 |
| 2,387,053 | Brown | Oct. 16, 1945 |
| 2,395,896 | Mitchell | Mar. 5, 1946 |
| 2,395,897 | Kethcart | Mar. 5, 1946 |